US012776009B2

(12) United States Patent
Qian et al.

(10) Patent No.: US 12,776,009 B2
(45) Date of Patent: Oct. 27, 2026

(54) FRINGE LINE DETECTION AND PHASE UNWRAPPING METHOD AND SYSTEM BASED ON FL-Net CONVOLUTIONAL NEURAL NETWORK

(71) Applicant: UNIVERSITY OF ELECTRONIC SCIENCE AND TECHNOLOGY OF CHINA, Chengdu (CN)

(72) Inventors: Jiang Qian, Chengdu (CN); Xin Ye, Qujing (CN); Haitao Lyu, Huzhou (CN); Xiaobo Yang, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 237 days.

(21) Appl. No.: 18/647,290

(22) Filed: Apr. 26, 2024

(65) Prior Publication Data

US 2025/0022107 A1 Jan. 16, 2025

(30) Foreign Application Priority Data

Jul. 12, 2023 (CN) ......................... 202310852055.4

(51) Int. Cl.

| | |
|---|---|
| ***G06T 5/60*** | (2024.01) |
| ***G06T 5/30*** | (2006.01) |
| ***G06T 5/73*** | (2024.01) |

(52) U.S. Cl.

CPC .................. *G06T 5/60* (2024.01); *G06T 5/30* (2013.01); *G06T 5/73* (2024.01); *G06T 2207/20084* (2013.01)

(58) Field of Classification Search

CPC .... G06T 5/60; G06T 5/73; G06T 5/30; G06T 2207/20084

See application file for complete search history.

(56) References Cited

U.S. PATENT DOCUMENTS

| | | | | |
|---|---|---|---|---|
| 2008/0234981 A1* | 9/2008 | Sartor | ........................ | G06T 5/73 702/190 |
| 2022/0092812 A1* | 3/2022 | Boudreaux | ............ | G06V 10/82 |

OTHER PUBLICATIONS

Digital Elevation Model Enhancement using CNN-Based Despeckled SAR Images Saied et al. (Year: 2020).*

Applications of SAR Inteferometry in Earth and Environmental Science Research Zhou et al (Year: 2009).*

* cited by examiner

*Primary Examiner* — Christopher S Kelley

(74) *Attorney, Agent, or Firm* — Hemisphere Law, PLLC

(57) ABSTRACT

Provided is a fringe line detection and phase unwrapping method and system based on an FL-Net convolutional neural network. The method includes: constructing the FL-Net convolutional neural network; detecting fringe lines of an input image by using the FL-Net convolutional neural network to obtain an image with detected fringe lines; performing circulation integral on the detected fringe lines to repair the detected fringe lines to thereby obtain an image with repaired fringe lines; performing path integral on the repaired fringe lines to unwrap the repaired fringe lines to thereby obtain an image with unwrapped fringe lines; and identifying error points of the unwrapped fringe lines by using the FL-Net convolutional neural network; and processing the error points. Specifically, an HDC method is used to replace a down-sampling method to avoid the loss of resolution, and residual connection is used to prevent the network from being too deep.

9 Claims, 12 Drawing Sheets

FRINGE LINE DETECTION AND PHASE UNWRAPPING METHOD AND SYSTEM BASED ON FL-Net CONVOLUTIONAL NEURAL NETWORK

TECHNICAL FIELD

The disclosure relates to the field of radar imaging technologies, particularly to a fringe line detection and phase unwrapping method based on a flow net (FL-Net) convolutional neural network, and a fringe line detection and phase unwrapping system based on the FL-Net convolutional neural network.

BACKGROUND

Phase unwrapping is the key of processing of interferometric synthetic aperture radar (InSAR) data, and a fringe line detection algorithm is to realize the phase unwrapping by detecting a fringe line formed at adjacent pixels with phase jump in wrapped phases. Specifically, the number of fringe lines along an integral path between a reference pixel and a current pixel is obtained, a product is obtained by multiplying the number of fringe lines by 2 pi (π), and the product is added to a phase difference of the current pixel, in this way, all pixels are unwrapped. A traditional algorithm based on fringe line unwrapping is sensitive to noise or other interference factors. Noise may destroy fringe lines or produce new fringe lines, which may lead to a wrong phase unwrapping result.

SUMMARY

In view of this, the purpose of the disclosure is to provide a fringe line detection and phase unwrapping method based on flow net (FL-Net) convolutional neural network, and a fringe line detection and phase unwrapping system based on FL-Net convolutional neural network. This method is based on two-dimensional phase unwrapping of fringe detection, and belongs to a method for processing of InSAR data in a radar imaging technology.

In order to achieve the above purpose, the disclosure provides the following technical solutions.

An embodiment provides a fringe line detection and phase unwrapping method based on an FL-Net convolutional neural network, which includes:

- constructing the FL-Net convolutional neural network;
- detecting fringe lines of an input image by using the FL-Net convolutional neural network to obtain an image with detected fringe lines;
- performing circulation integral on the detected fringe lines to repair the detected fringe lines to thereby obtain an image with repaired fringe lines;
- performing path integral on the repaired fringe lines to unwrap the repaired fringe lines to thereby obtain an image with unwrapped fringe lines; and
- identifying error points of the unwrapped fringe lines by using the FL-Net convolutional neural network; and
- processing the error points.

In an embodiment, the performing circulation integral on the detected fringe lines to repair the detected fringe lines to thereby obtain the image with repaired fringe lines includes:

- taking four corners of each pixel of the image with detected fringe lines as graph nodes;
- determining graph nodes on each of the detected fringe lines, connected with only one graph node and excepting graph nodes on a boundary of the image with the detected fringe lines, as breakpoints; and
- connecting every two breakpoints by using a nearest neighbor principle to obtain a connected line of the every two breakpoints, and assigning values to pixels near the connected line based on a principle of a closed-loop integral being 0, including:
- connecting a shortest connection path according to a distance between breakpoints when the breakpoints are spaced apart; and
- connecting breakpoints on a same fringe line, determining a pixel direction of each to-be-repaired path corresponding to the connected breakpoints, and assigning values to adjacent two pixels in the pixel direction to thereby repair the fringe lines.

In an embodiment, the performing path integral on the repaired fringe lines to unwrap the repaired fringe lines to thereby obtain an image with unwrapped fringe lines includes:

- unwrapping the repaired fringe lines first in a horizontal path and then in a vertical path, including:
  - selecting an upper left corner of the image with repaired fringe lines as a reference point; in a situation that a to-be-repaired path of the repaired fringe lines passes from a pixel with a value of 1 to a pixel with a value of −1, a corresponding wrapped phase is added by 2π, and in a situation that a to-be-repaired path of the repaired fringe lines passes from a pixel with a value of −1 to a pixel with a value of 1, a corresponding wrapped phase is subtracted by 2π.

In an embodiment, the FL-Net convolutional neural network includes: an input convolution module, multiple hybrid dilated convolution residual (HDCRES) modules, and an output convolution module; and each of the multiple HDCRES modules includes multiple dilation convolution modules sequentially connected; a convolution operation is performed on the input image by the input convolution module, and then the input image is processed by the plurality of HDCRES modules, and finally the input image is classified by an convolution operation of the output convolution module.

In an embodiment, each of the multiple HDCRES modules includes three dilation convolution modules, and dilation rates of the three dilation convolution modules are set by adopting serrated dilation rates.

In an embodiment, the input convolution module is a 3×3 convolution module, or the output convolution module is a 3×3 convolution module.

In an embodiment, the detecting fringe lines of the input image by using the FL-Net convolutional neural network to obtain the image with detected fringe lines includes: detecting the fringe lines by using the FL-Net convolutional neural network, generating absolute phases and wrapped phases by using a shuttle radar topography mission (SRTM) digital elevation model (DEM), and detecting horizontal and vertical phase jump boundaries by a preset filter; and overlapping the horizontal and vertical jump boundaries to obtain the fringe lines, using the fringe lines as labels for training the FL-Net convolutional neural network, and adding noise to the wrapped phases as an input of the FL-Net convolutional neural network.

An embodiment provides fringe line detection and phase unwrapping system based on an FL-Net convolutional neural network, which includes: a processor; and a memory with a computer program stored therein, wherein the computer program, when executed by the processor, is configured to implement a fringe line detection and phase unwrapping method based on an FL-Net convolutional neural network The disclosure has at least the following beneficial effects.

The disclosure provides a fringe line detection phase and unwrapping method based on FL-Net convolutional neural network, and a fringe line detection and phase unwrapping system based on FL-Net convolutional neural network, which belongs to a method for processing of InSAR data in a radar imaging technology. Fringe lines with wrapped phases are detected based on the FL-Net convolutional neural network to realize phase unwrapping.

In a structure of the FL-Net convolutional neural network, a hybrid dilation convolution (HDC) method is used to replace a down-sampling method to avoid the loss of resolution, and residual connection is used to prevent the network from being too deep. Even though a prediction accuracy of fringe lines with wrapped phases based on the FL-Net convolutional neural network is high enough, the detection cannot be guaranteed to be completely correct. Based on this, the disclosure proposes a method of using an undirected graph and circulation integral to repair broken fringe lines. Error points caused by noise are identified by the FL-Net convolutional neural network, and the influence of the error points on phase unwrapping is basically eliminated by processing phases of the error points.

Compared with a traditional fringe line detection method, a fringe line detection method based on deep learning proposed in the disclosure can effectively eliminate a phase unwrapping error caused by noise destroying fringe line.

Other advantages, objects and features of the disclosure will be set forth in the following description to some extent, and will be apparent in part to those skilled in the art based on the following description, or may be taught from the practice of the disclosure. The objects and other advantages of the disclosure can be realized and obtained by the following description.

BRIEF DESCRIPTION OF DRAWINGS

In order to make the purpose, technical solutions and beneficial effects of the disclosure more clearly, the disclosure provides the following drawings for explanation.

FIG. 4A and FIG. 4B illustrate simulated wrapped phases and corresponding fringe lines, in which, FIG. 4A illustrates an image of noisy wrapped phases; and FIG. 4B illustrates an image of the corresponding fringe lines.

FIG. 5A and FIG. 5B illustrate broken fringe lines and a corresponding phase unwrapping result, in which, FIG. 5A illustrates the broken fringe lines predicted by the FL-Net convolutional neural network; and FIG. 5B illustrates the phase unwrapping result of the broken fringe lines in FIG. 4A.

FIG. 7A and FIG. 7B illustrate schematic diagrams of an undirected graph and a circulation integral for repairing fringe lines, in which, FIG. 7A illustrates the undirected graph obtained from the fringe lines and pixel boundaries; and FIG. 7B illustrates an image of the circulation integral.

FIG. 8A and FIG. 8B illustrate repaired fringe lines and a corresponding phase unwrapping result, in which, FIG. 8A illustrates the repaired fringe lines; and FIG. 8B illustrates the phase unwrapping result of the broken fringe lines in FIG. 8A.

FIG. 10A and FIG. 10B illustrate simulated error points, in which, FIG. 10A illustrates absolute phase image with error points; and FIG. 10B illustrates values and positions of the error points.

FIG. 11A and FIG. 11B illustrate error point identification and post-processing, in which, FIG. 11A illustrates error points predicted by the FL-Net convolutional neural network; and FIG. 11B illustrates a final phase unwrapping result.

FIG. 12A through FIG. 12J illustrate unwrapping results of two study areas, in which, FIG. 12A and FIG. 12B illustrate diagrams of absolute phases of the two study areas; FIG. 12C and FIG. 12D illustrate diagrams of wrapped phases of the two study areas; FIG. 12E and FIG. 12F illustrate unwrapping results of fringe lines of the two study areas; FIG. 12G and FIG. 12H illustrate diagrams of unwrapping errors of the two study areas; and FIG. 12I and FIG. 12J illustrate rewrapping results of the unwrapping results of the two study areas.

DETAILED DESCRIPTION OF EMBODIMENTS

The disclosure will be further described in combination with the drawings and specific embodiments, so that those skilled in the art can better understand and implement the disclosure, but the given embodiments are not taken as limitations of the disclosure.

Figure 1:
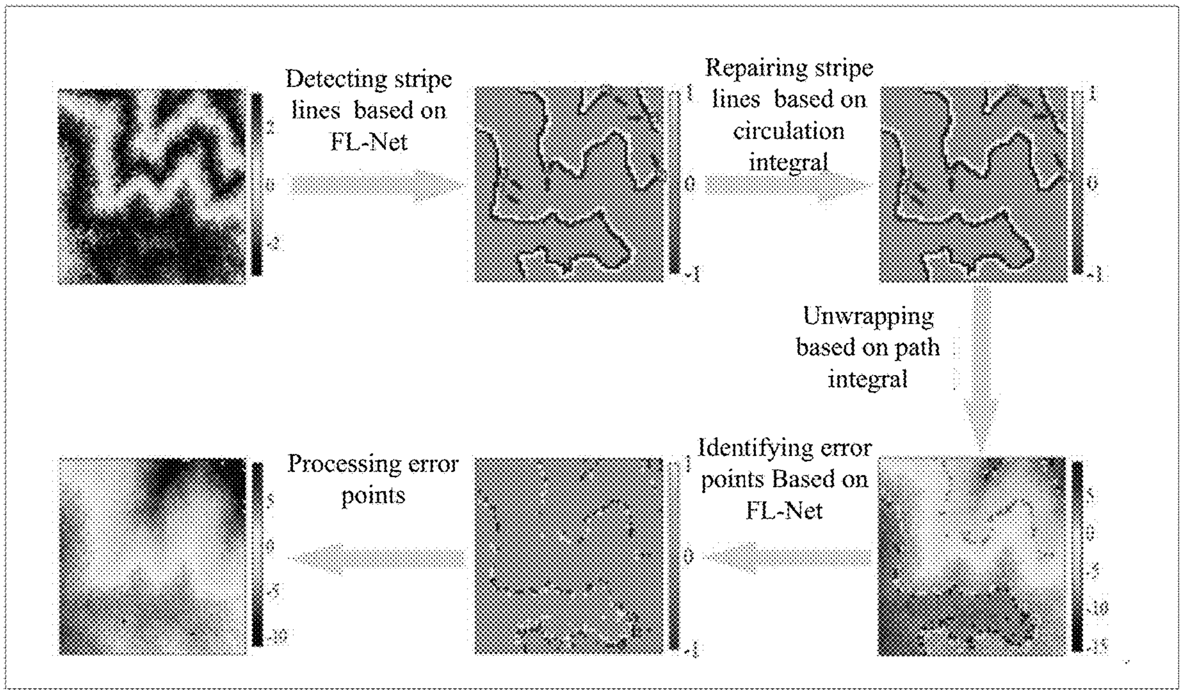
FIG. 1 illustrates a flow chart of a phase unwrapping process based on FL-Net-based fringe line detection.

As shown in FIG. 1, an embodiment of the disclosure provides a fringe line detection and phase unwrapping method based on an FL-Net convolutional neural network, which includes the following steps:

- constructing the FL-Net convolutional neural network;
- detecting fringe lines of an input image by using the FL-Net convolutional neural network to obtain an image with detected fringe lines;
- performing circulation integral on the detected fringe lines to repair the detected fringe lines to thereby obtain an image with repaired fringe lines;
- performing path integral on the repaired fringe lines to unwrap the repaired fringe lines to thereby obtain an image with unwrapped fringe lines;
- identifying error points of the unwrapped fringe lines by using the FL-Net convolutional neural network; and
- processing the error points.

Figure 7A:
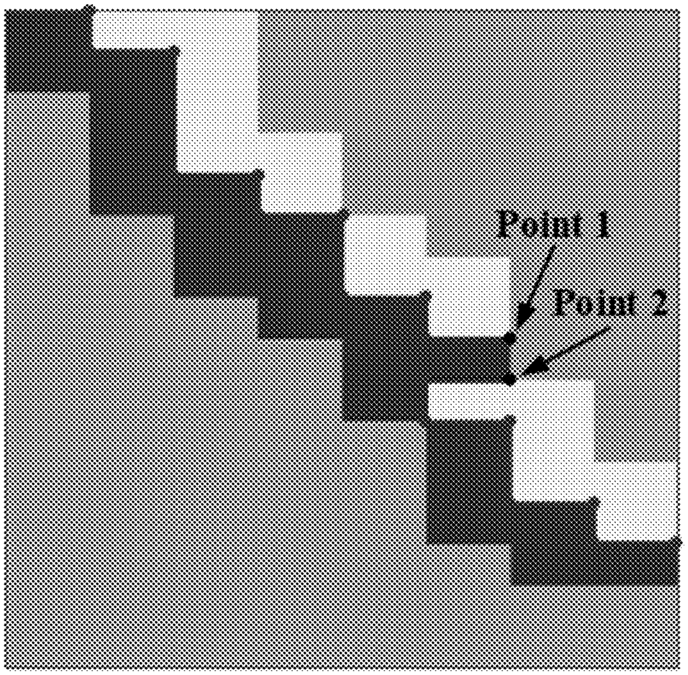
Figure 7B:
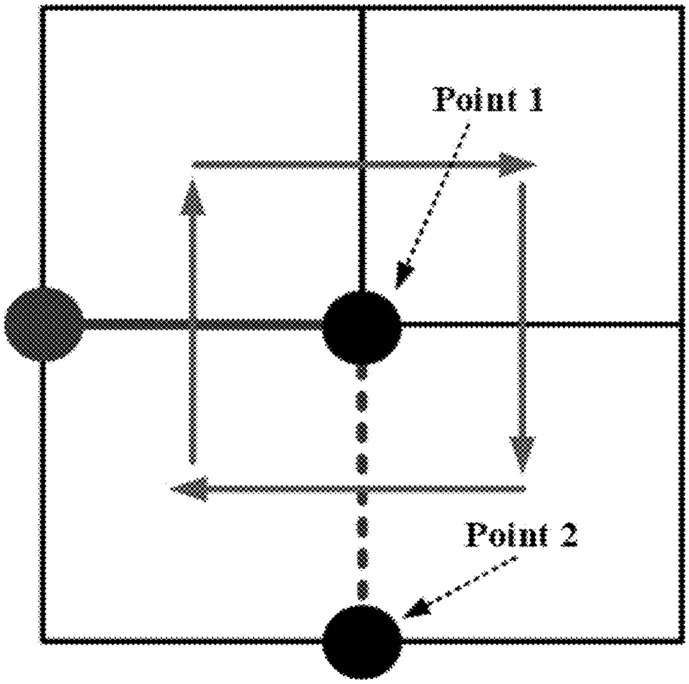

In an embodiment, the performing circulation integral on the detected fringe lines to repair the detected fringe lines to thereby obtain an image with repaired fringe lines includes:

- taking four corners of each pixel of the image with detected fringe lines as graph nodes;
- determining graph nodes on each of the detected fringe lines, connected with only one graph node and excepting graph nodes on a boundary of the image with the detected fringe lines, as breakpoints;
- connecting every two breakpoints by using a nearest neighbor principle to obtain a connected line of the every two breakpoints; specifically, connecting a shortest connection path according to a distance between breakpoints when the breakpoints are spaced apart; and
- assigning values to pixels near the connected line based on a principle of a closed-loop integral being 0, in which, as shown in FIG. 7B, paths in four directions need to pass through an existing fringe line and a to-be-connected fringe line, with the bold black line being the existing fringe line and the imaginary line being the to-be-connected fringe line. If a path passes from a pixel with a value of −1 to a pixel with a value of 1, an integral result is −1; if a path passes from a pixel with a value of 1 to a pixel with a value of −1, an integral result is 1; and integral results for other conditions are 0. According to this standard, integral results of four paths are added to obtain a final path integral result, which is required to be 0, so as to determine a pixel direction of a to-be-repaired path, and assign values to two adjacent pixels to repair the fringe line, that is, the path integral result of a to-be-repaired fringe line need to be opposite to that of the existing fringe line, so a pixel order of a path of the to-be-repaired fringe line and a pixel order of a path of the existing fringe line are opposite.

In an embodiment, the performing path integral on the repaired fringe lines to unwrap the repaired fringe lines to thereby obtain an image with unwrapped fringe lines includes:

unwrapping the repaired fringe lines first in a horizontal path and then in a vertical path, which includes: selecting an upper left corner of the image with repaired fringe lines as a reference point; in a situation that a to-be-repaired path passes from a pixel with a value of 1 to a pixel with a value of −1, a corresponding wrapped phase needs to be added by 2π, and in a situation that a to-be-repaired path passes from a pixel with a value of −1 to a pixel with a value of 1, a corresponding wrapped phase needs to be subtracted by 2π.

Figure 2:
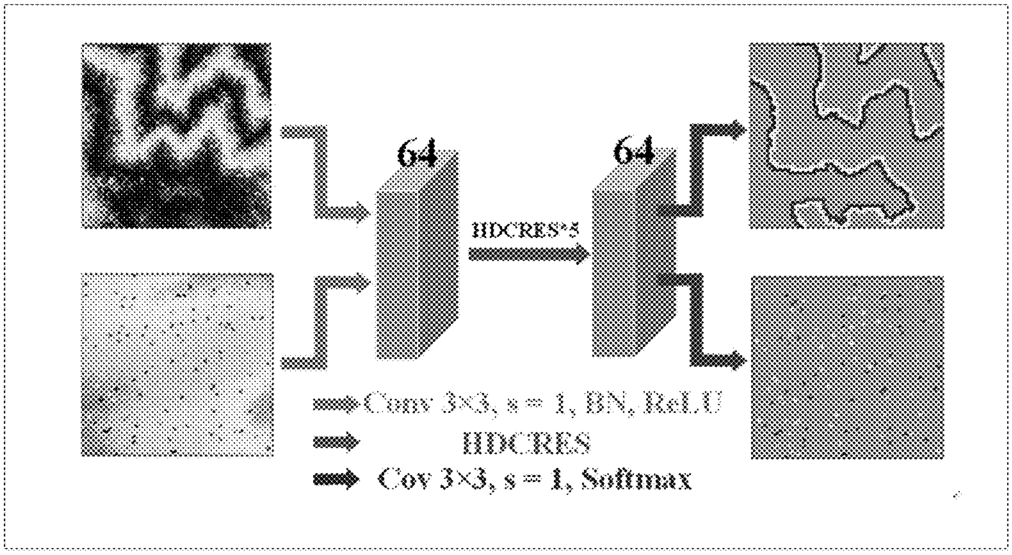
FIG. 2 illustrates a schematic block diagram of an FL-Net convolutional neural network.

As shown in FIG. 2, the FL-Net convolutional neural network is used to detect the fringe lines with wrapped phases to realize phase unwrapping. The FL-Net convolutional neural network includes an input convolution module, multiple HDCRES modules and an output convolution module, and the FL-Net convolutional neural network is used for feature extraction, can expand the receptive field and enhance the feature extraction performance without reducing the resolution. The input convolution module is configured to perform preliminary extraction of features of input data. The HDCRES modules are configured to extract features of data. The output convolution module is configured to perform dimensionality reduction. In an embodiment, the FL-Net convolutional neural network includes five HDCRES modules. It should be noted that, each of the above modules is embodied by software stored in at least one memory and executable by at least one processor.

Figure 3:
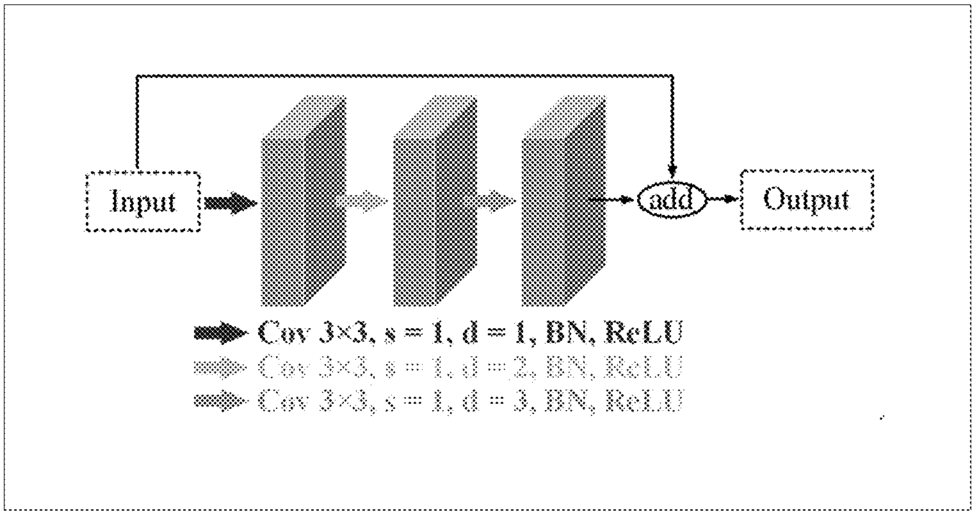
FIG. 3 illustrates a schematic structural diagram of a hybrid dilated convolution residual (HDCRES) module.

The FL-Net convolutional neural network provided by the disclosure is a convolutional neural network used for fringe detection and error point identification. In order to avoid the loss of resolution, a hybrid dilation convolution (HDC) method is used to replace a down-sampling method to obtain enough receptive field, residual connection is added to the HDC, and the HDC is improved to obtain HDCRES. As shown in FIG. 3, each HDCRES module includes several dilation convolution modules connected in sequence, and dilation rates of the dilation convolution modules are set according to a preset mode, serrated dilation rates are adopted to avoid discontinuous information extraction. By setting different dilation rates, dilation convolution modules can obtain different receptive fields without losing resolution and without changing the parameter quantity. In the disclosure, the serrated dilation rates can be set according to the actual situation, or can be obtained in other ways, and the selected dilation rates cannot have a common divisor greater than 1.

In an embodiment, each HDCRES module consists of three dilation convolution modules, and dilation rates of the three dilation convolution modules are 1, 2 and 3, respectively. In an embodiment, HDC can avoid information loss when dilation convolutions are used continuously, and residual connection can prevent the network from being too deep. In the disclosure, the HDCRES is obtained by combining the HDC and the residual connection.

Therefore, the input image undergoes 3×3 convolution operation first, then passes through five HDCRES modules, and finally completes the classification through 3×3 convolution operation. The specific implementation process is as follows.

Firstly, fringe lines are detected by using the FL-Net convolutional neural network, and absolute phases and wrapped phases are generated by using a shuttle radar topography mission (SRTM) digital elevation model (DEM). The SRTM DEM is intercepted by using a sliding window of 64×64 and a step size of 64, and converted into the absolute phases. Then the absolute phases are wrapped to obtain noiseless wrapped phases. Horizontal and vertical phase jump boundaries in the noiseless wrapped phases are detected by a preset filter. The preset filter in an embodiment adopts a 1×2 filter and a 2×1 filter. When values of two pixels in the filter are multiplied and a negative number is obtained, and absolute values of the values of the two pixels are greater than a set threshold, it is considered that there is a phase jump, and based on this, the horizontal and vertical jump boundaries can be detected.

Figure 4A:
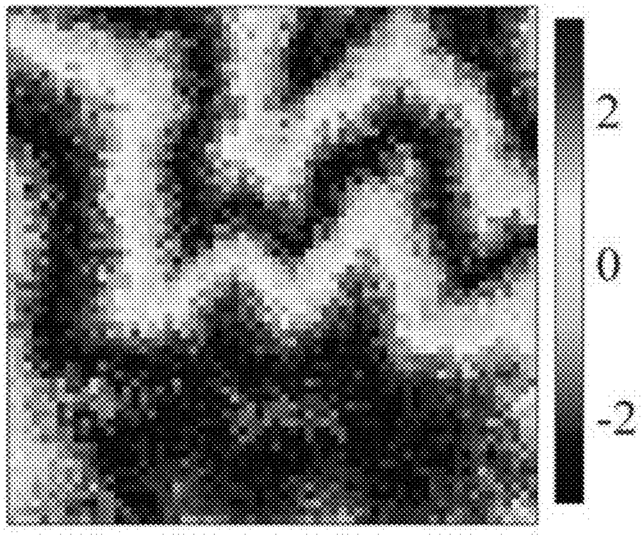
Figure 4B:
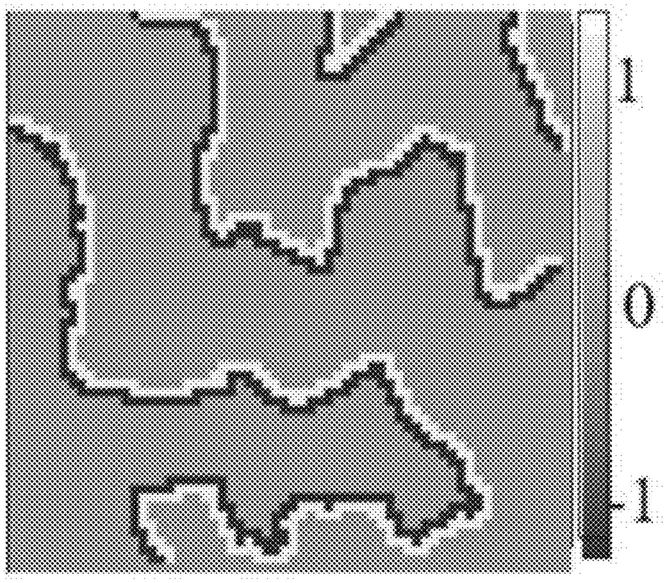

Then the horizontal and vertical jump boundaries are overlapped to obtain complete fringe lines, which are used as labels for training the FL-Net convolutional neural network, and then noise is added to the noiseless wrapped phases as an input of the FL-Net convolutional neural network. FIG. 4A and FIG. 4B illustrate noisy wrapped phases and corresponding fringe lines. Pixel values of the image with the fringe lines consists of −1, 0, and 1. On a boundary from a pixel value of 1 to a pixel value of −1, a phase should be added by 2π, otherwise it should be subtracted by 2π. A size of the image with the fringe lines is 64×64, and the number of images in a training data set and the number of images in a testing data set are 8000 and 800, respectively.

Figure 5A:
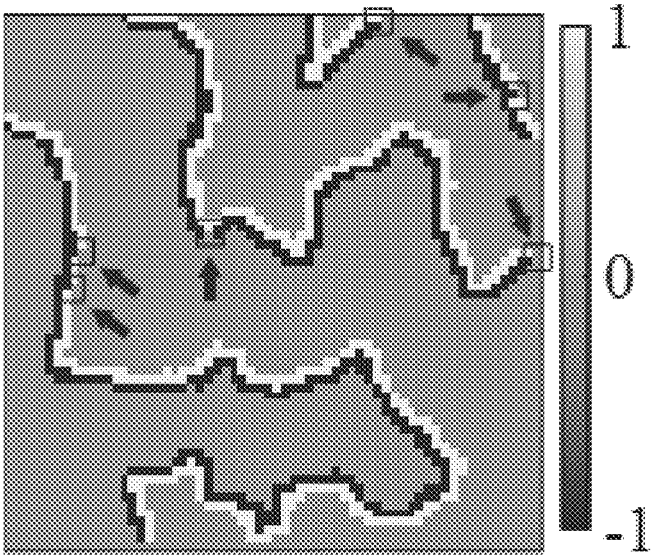

FIG. 5A illustrates fringe lines predicted by the trained FL-Net convolutional neural network on a test set. It can be seen that the FL-Net convolutional neural network can effectively predict the fringe lines with wrapped phase, and an average accuracy of 800 test images reaches 96.1%. Although the detection accuracy is high enough, it cannot be guaranteed to be completely correct. Therefore, some fringe lines will be broken, as shown in positions marked with boxes and indicated by arrows in FIG. 5A.

Figure 6:
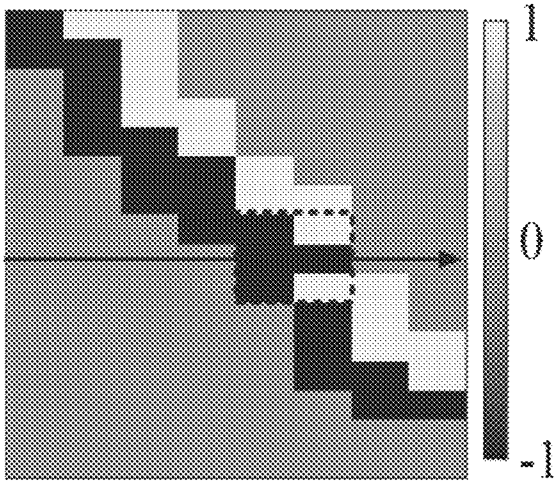
FIG. 6 illustrates an image of broken fringe lines.

In FIG. 6, when a wrapped phase is unwrapped and an integral path passes through the broken fringe line, a final result will increase or decrease by 2π compared with an actual result.

Figure 5B:
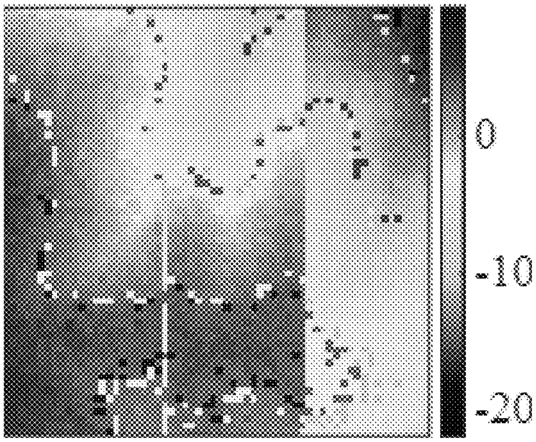

FIG. 5B illustrates the unwrapping result through unwrapping first in a horizontal path and then in a vertical path, in which, an upper left corner of the image with repaired fringe lines is selected as a reference point. The upper left corner corresponds to an upper left pixel at a position [1, 1]. When an integral path passes through a top breakpoint area, an error will propagate to a right half portion of the unwrapping result.

Figure 8A:
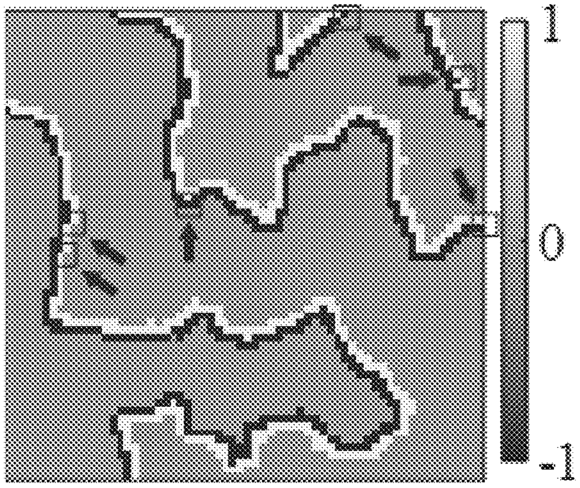
Figure 8B:
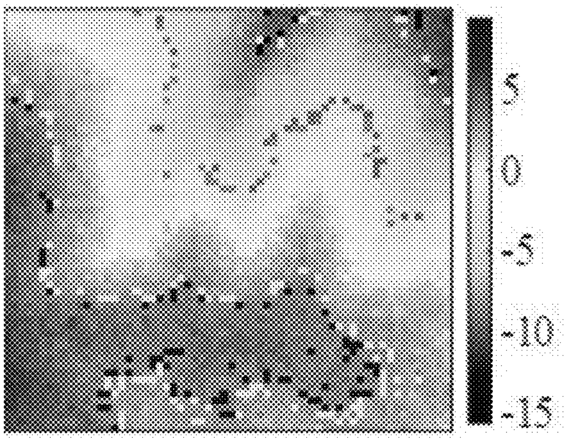

In an embodiment, an undirected graph is used to repair a fringe line, as shown in FIG. 7A and FIG. 7B, which illustrate schematic diagrams of an undirected graph and a circulation integral for repairing the fringe line. That is, four corner points of each pixel are taken as graph nodes, and all graph nodes on the fringe line are connected with each other (FIG. 7A). Except for points on a boundary of an image, only graph nodes each connected with one graph node are breakpoints, for example, points 1 and 2, as shown in FIG. 7A. A nearest neighbor principle is used to connect the two breakpoints to obtain a connected line, and then a principle of a closed-loop integral being 0 is used to assign values to pixels near the connected line (FIG. 7B). A shortest connection path is found and connected according to a distance between breakpoints when the two breakpoints are spaced apart. FIG. 8A illustrates the repaired fringes. Compared with FIG. 5A, the breakpoints on the same fringe line are connected correctly, and directions of the fringe lines are also correct. Compared with FIG. 5A, the phase unwrapping result (FIG. 8B) of the broken fringe lines in FIG. 8A shows that the problem of error propagation has been solved.

Figure 9:
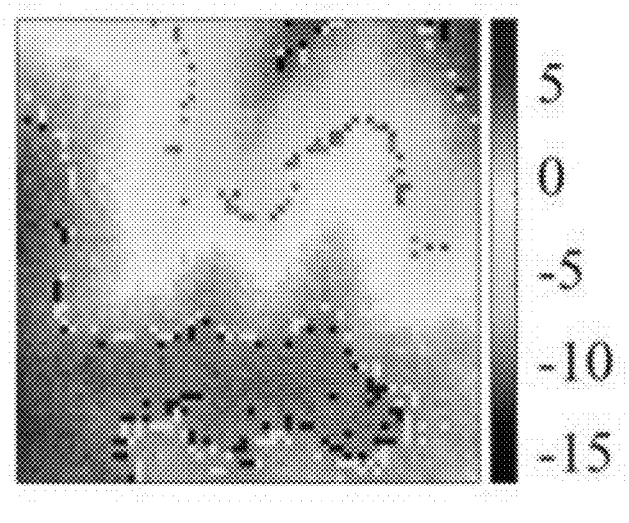
FIG. 9 illustrates error points caused by a fringe line error.
Figure 10A:
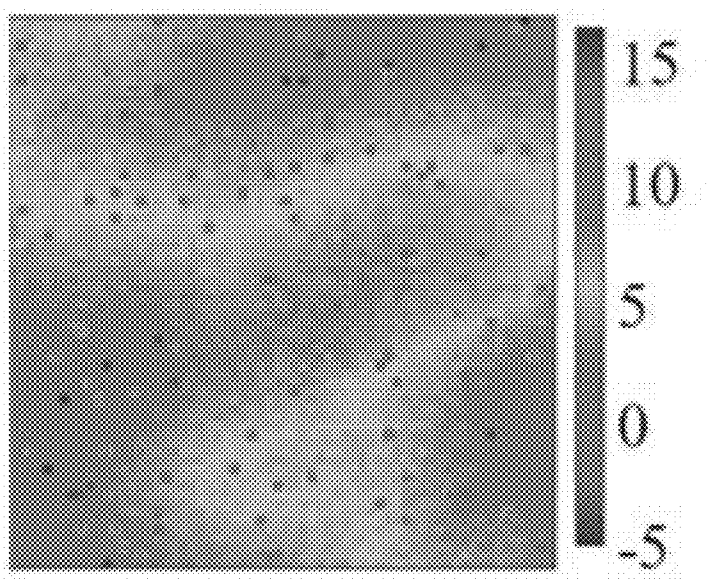
Figure 10B:
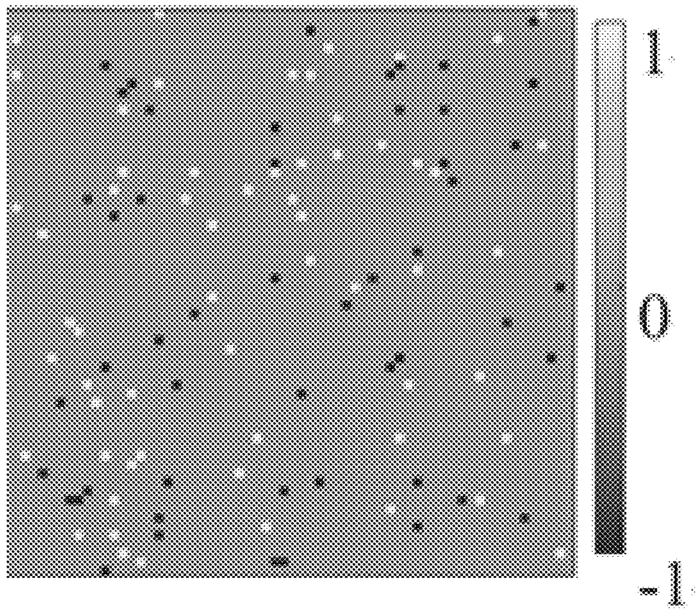
Figure 11A:
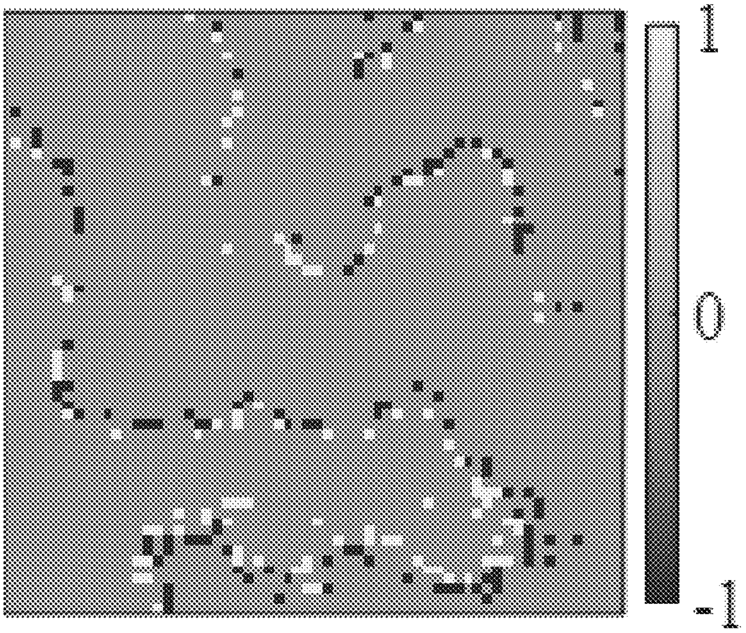
Figure 11B:
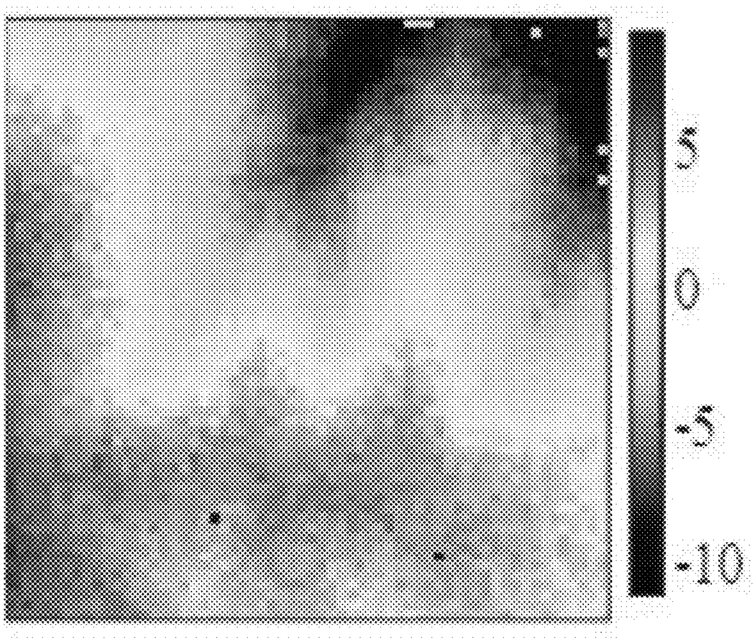

Secondly, because the wrapped phases are noisy, the fringe lines itself cannot be completely correct, which leads to errors in the image with unwrapping phases. Compared with the true phase values, these points are increased or decreased by $2\pi$, and mainly distributed around the fringe lines (FIG. 9), so the FL-Net convolutional neural network continues to be used for error point identification. Absolute phases are obtained by using the SRTM DEM. After adding noise, some points are randomly selected to increase or decrease phase of $2\pi$ (FIG. 10A). These random points are stored as training labels (FIG. 10B). When a phase of an error point increases $2\pi$, a label value is 1, otherwise it is −1. An input of the FL-Net convolutional neural network is the absolute phase of the error point, and an output of the FL-Net convolutional neural network is a position and a value of the error point. A size of an image is 64×64, and the number of images in a training data set and the number of images in a testing data set are 8000 and 800, respectively. Combining FIG. 8B and FIG. 11A, further post-processing is carried out, that is, according to an identified error point, if a pixel value of the error point is 1, the corresponding pixel value is subtracted by $2\pi$; if a pixel value of the error point is −1, the corresponding pixel value is added by $2\pi$; and if the error point is 0, no processing is needed, so as to obtain the final phase unwrapping result (FIG. 11B). It can be seen that most of the error points have been eliminated.

Figure 12A:
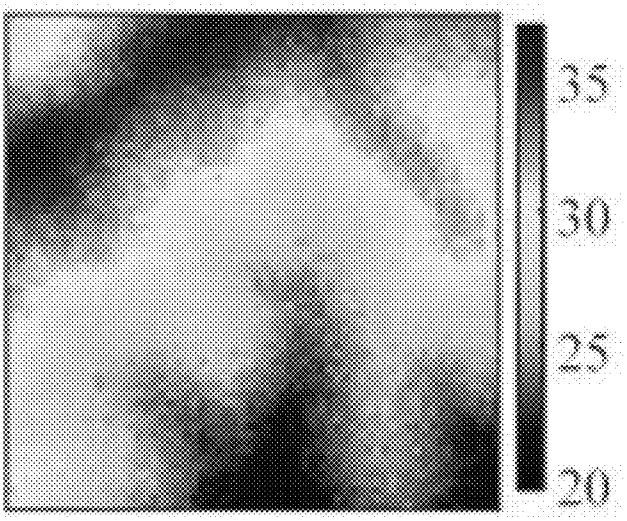
Figure 12B:
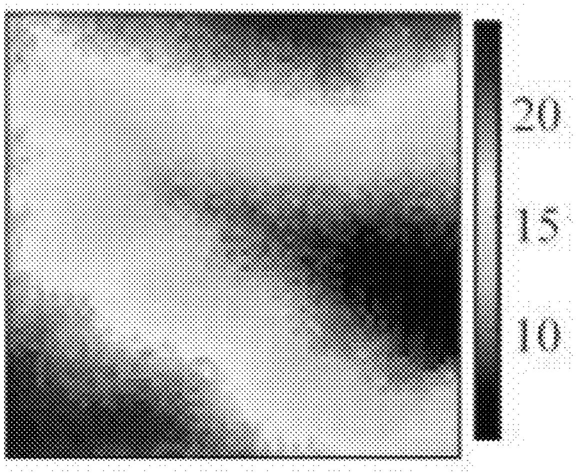
Figure 12C:
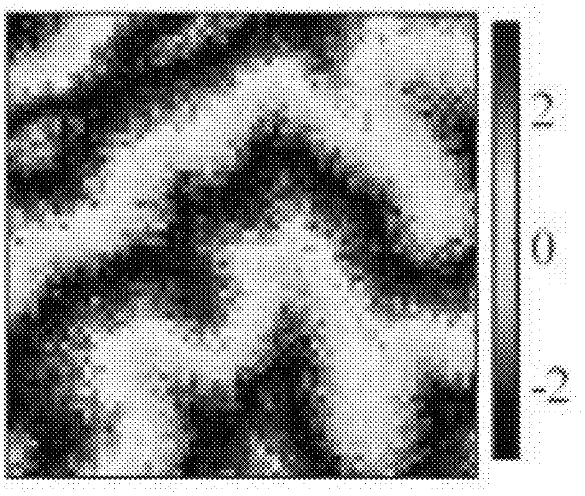
Figure 12D:
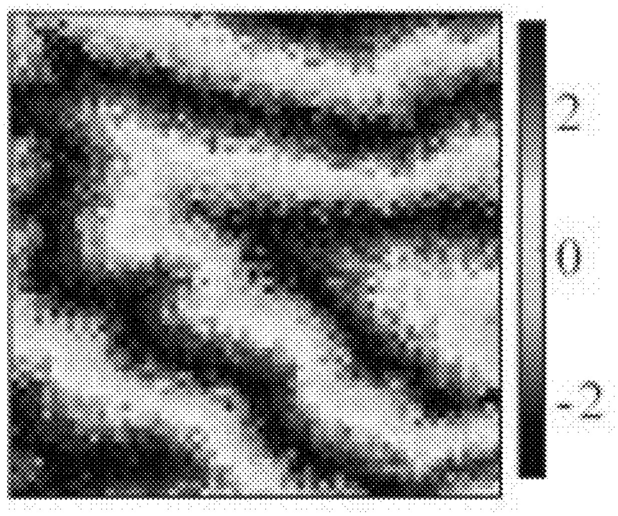
Figure 12E:
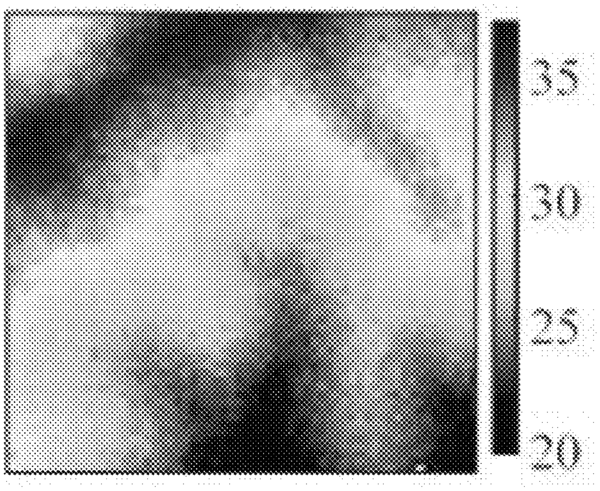
Figure 12F:
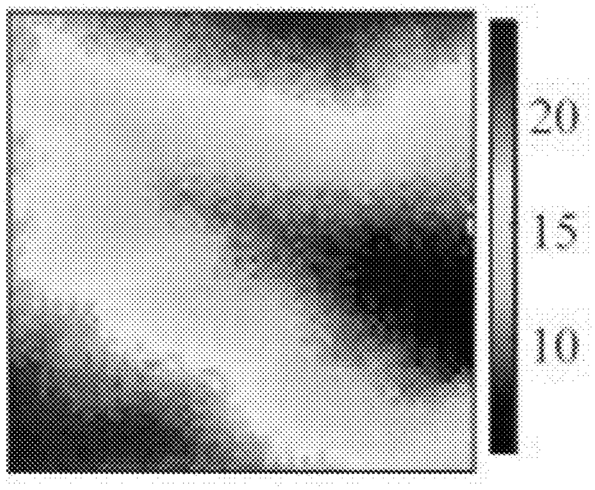
Figure 12G:
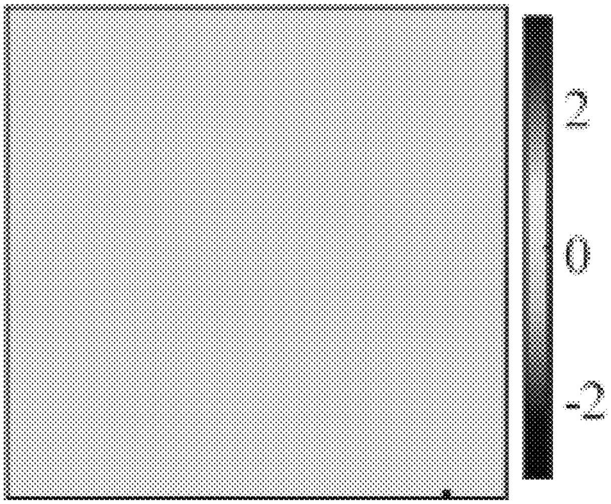
Figure 12H:
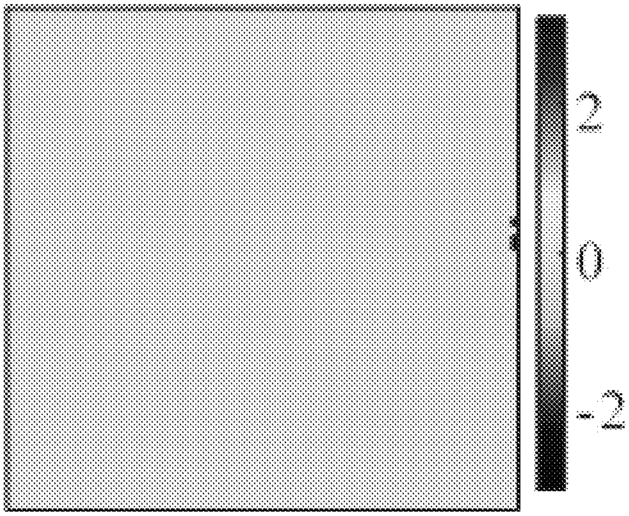
Figure 12I:
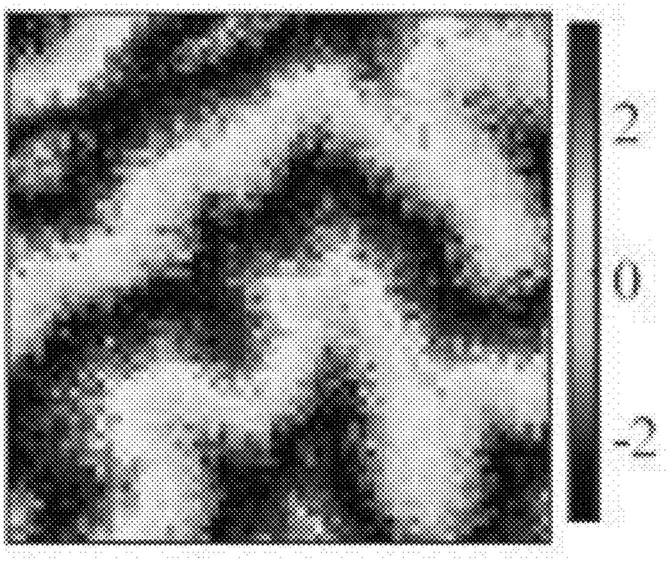
Figure 12J:
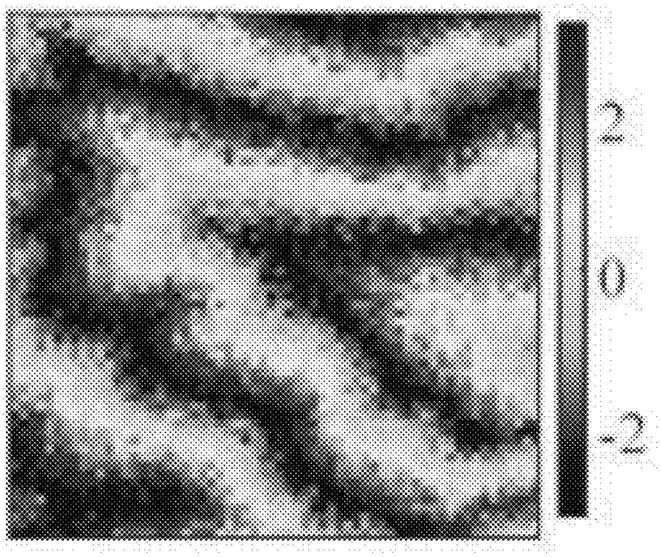

In FIG. 12A through FIG. 12J, phase unwrapping results of two study areas are shown. From diagrams of unwrapping errors of the two study areas in FIG. 12G and FIG. 12H, only a few pixels have errors, and the errors of these pixels are integer multiples of $2\pi$, so rewrapping results of the unwrapping results of the two study areas in FIG. 12I and FIG. 12J are still consistent with diagrams of wrapped phases of the two study areas in FIG. 12C and FIG. 12D, which proves that the method of the disclosure can effectively ensure the consistency of the rewrapping fringes.

An embodiment of the disclosure also provides a fringe line detection and phase unwrapping system based on an FL-Net convolutional neural network, which includes a processor; and a memory with a computer program stored therein, the computer program, when executed by the processor, is configured to implement the fringe line detection and phase unwrapping method based on an FL-Net convolutional neural network.

1. The disclosure a convolutional neural network, FL-Net is proposed to detect the fringe lines with wrapped phases to realize phase unwrapping.
2. In a structure of the FL-Net convolutional neural network, a hybrid dilation convolution (HDC) method is used to replace a down-sampling method to avoid the loss of resolution, and residual connection is used to prevent the network from being too deep.
3. Even though a prediction accuracy of fringe lines with wrapped phases based on the FL-Net convolutional neural network is high enough, the detection cannot be guaranteed to be completely correct. Based on this, the disclosure proposes a method of using an undirected graph and circulation integral to repair broken fringe lines. As shown in FIG. 1, steps for repairing the fringe lines are shown, a phase unwrapping result without fringe line repair is shown in FIG. 5, and a phase unwrapping result after fringe line repair is shown in FIG. 8. The comparison between FIG. 5 and FIG. 8 shows the importance of this repair solution.
4. In the disclosure, error points caused by noise are identified by the FL-Net convolutional neural network, and the influence of the error points on phase unwrapping is basically eliminated by processing phases of the error points.

The embodiments described above are only the exemplary embodiments for fully explaining the disclosure, and the scope of protection of the disclosure is not limited to this. Equivalent substitutions or transformations made by those skilled in the art on the basis of the disclosure are all within the scope of protection of the disclosure. The scope of protection of the disclosure is subject to the claims.

What is claimed is:

1. A fringe line detection and phase unwrapping method based on a flow net (FL-Net) convolutional neural network, comprising:

constructing the FL-Net convolutional neural network;

detecting fringe lines of an input image by using the FL-Net convolutional neural network to obtain an image with detected fringe lines;

performing circulation integral on the detected fringe lines to repair the detected fringe lines to thereby obtain an image with repaired fringe lines;

performing path integral on the repaired fringe lines to unwrap wrapped phases according to the repaired fringe lines to thereby obtain an image with unwrapped phases; and identifying error points of the unwrapped phases fringe lines by using the FL-Net convolutional neural network; and processing the error points to obtain an output result;

wherein the FL-Net convolutional neural network comprises: an input convolution module, a plurality of hybrid dilated convolution residual (HDCRES) modules, and an output convolution module; and wherein each of the plurality of HDCRES modules comprises a plurality of dilation convolution modules sequentially connected; and a convolution operation is performed on the input image by the input convolution module, and then the input image is processed by the plurality of HDCRES modules, and finally the input image is classified by a convolution operation of the output convolution module.

2. The fringe line detection and phase unwrapping method based on the FL-Net convolutional neural network according to claim 1, wherein the performing circulation integral on the detected fringe lines to repair the detected fringe lines to thereby obtain the image with repaired fringe lines comprises:

taking four corners of each pixel of the image with detected fringe lines as graph nodes;

determining graph nodes on each of the detected fringe lines, connected with only one graph node and excepting graph nodes on a boundary of the image with the detected fringe lines, as breakpoints; and connecting every two breakpoints by using a nearest neighbor principle to obtain a connected line of the every two breakpoints, and assigning values to pixels near the connected line based on a principle of a closed-loop integral being 0, comprising:

connecting a shortest connection path according to a distance between breakpoints when the breakpoints are spaced apart; and connecting breakpoints on a same fringe line, determining a pixel direction of each to-be-repaired path corresponding to the connected breakpoints, and assigning values to adjacent two pixels in the pixel direction to thereby repair the fringe lines.

3. The fringe line detection and phase unwrapping method based on the FL-Net convolutional neural network according to claim 1, wherein the performing path integral on the repaired fringe lines to unwrap wrapped phases according to—the repaired fringe lines to thereby obtain the image with unwrapped phases comprises:

unwrapping the wrapped phases first in a horizontal path and then in a vertical path, comprising:

selecting an upper left corner of the image with repaired fringe lines as a reference point; in a situation that one of the repaired fringe lines passes from a pixel with a value of 1 to a pixel with a value of −1, a corresponding one of the wrapped phases is added by 2π, and in a situation that one of the repaired fringe lines passes from a pixel with a value of −1 to a pixel with a value of 1, a corresponding one of the wrapped phases is subtracted by 2π.

4. The fringe line detection and phase unwrapping method based on the FL-Net convolutional neural network according to claim 1, wherein each of the plurality of HDCRES modules comprises three dilation convolution modules, and dilation rates of the three dilation convolution modules are set by adopting serrated dilation rates.

5. The fringe line detection and phase unwrapping method based on the FL-Net convolutional neural network according to claim 1, wherein the input convolution module is a 3×3 convolution module, or the output convolution module is a 3×3 convolution module.

6. The fringe line detection and phase unwrapping method based on the FL-Net convolutional neural network according to claim 1, wherein the detecting fringe lines of the input image by using the FL-Net convolutional neural network to obtain the image with detected fringe lines comprises:

detecting the fringe lines by using the FL-Net convolutional neural network, generating absolute phases and the wrapped phases by using a shuttle radar topography mission (SRTM) digital elevation model (DEM), and detecting horizontal and vertical phase jump boundaries by a preset filter; and overlapping the horizontal and vertical jump boundaries to obtain the fringe lines, using the fringe lines as labels for training the FL-Net convolutional neural network, and adding noise to the wrapped phases as an input of the FL-Net convolutional neural network.

7. A fringe line detection and phase unwrapping system based on an FL-Net convolutional neural network, comprising:

a processor; and a memory with a computer program stored therein, wherein the computer program, when executed by the processor, is configured to implement a fringe line detection and phase unwrapping method based on an FL-Net convolutional neural network according to claim 1.

8. A fringe line detection and phase unwrapping method based on an FL-Net convolutional neural network, comprising:

constructing the FL-Net convolutional neural network;

detecting fringe lines of an input image by using the FL-Net convolutional neural network to obtain an image with detected fringe lines;

performing circulation integral on the detected fringe lines to repair the detected fringe lines to thereby obtain an image with repaired fringe lines, comprising:

taking four corners of each pixel of the image with detected fringe lines as graph nodes;

determining graph nodes on each of the detected fringe lines, connected with only one graph node and excepting graph nodes on a boundary of the image with the detected fringe lines, as breakpoints; and connecting every two breakpoints by using a nearest neighbor principle to obtain a connected line of the every two breakpoints, and assigning values to pixels near the connected line based on a principle of a closed-loop integral being 0, comprising:

connecting a shortest connection path according to a distance between breakpoints when the breakpoints are spaced apart; and connecting breakpoints on a same fringe line, determining a pixel direction of each to-be-repaired path corresponding to the connected breakpoints, and assigning values to adjacent two pixels in the pixel direction to thereby repair the fringe lines;

performing path integral on the repaired fringe lines to unwrap wrapped phases according to the repaired fringe lines to thereby obtain an image with unwrapped phases; and identifying error points of the unwrapped phases by using the FL-Net convolutional neural network;

and processing the error points to obtain an output result.

9. A fringe line detection and phase unwrapping method based on an FL-Net convolutional neural network, comprising:

constructing the FL-Net convolutional neural network;

detecting fringe lines of an input image by using the FL-Net convolutional neural network to obtain an image with detected fringe lines;

performing circulation integral on the detected fringe lines to repair the detected fringe lines to thereby obtain an image with repaired fringe lines;

performing path integral on the repaired fringe lines to unwrap wrapped phase according to the repaired fringe lines to thereby obtain an image with unwrapped phases, comprising:

unwrapping the wrapped phases lines first in a horizontal path and then in a vertical path, comprising:

selecting an upper left corner of the image with repaired fringe lines as a reference point; in a situation that one of the repaired fringe lines passes from a pixel with a value of 1 to a pixel with a value of −1, a corresponding one of the wrapped phases is added by 2π, and in a situation that one of the repaired fringe lines passes from a pixel with a value of −1 to a pixel with a value of 1, a corresponding one of the wrapped phases is subtracted by 2π; and identifying error points of the unwrapped phases by using the FL-Net convolutional neural network; and processing the error points to obtain an output result.

* * * * *